United States Patent [19]

Schiffman

[11] 3,840,814

[45] Oct. 8, 1974

[54] SYSTEM FOR GENERATING PULSES OF LINEARLY VARYING PERIOD

[75] Inventor: Murray M. Schiffman, Westport, Conn.

[73] Assignees: Cambridge Research & Development Group, Westport, Conn.; Sanford G. Greenberg, Washington, D.C.; DT Liquidating Partnership, c/o Jay M. Haft, New York, N.Y.; Murray M. Schiffman, Westport, Conn.

[22] Filed: Feb. 12, 1973

[21] Appl. No.: 331,575

[52] U.S. Cl. .................. 328/58, 307/228, 307/260, 307/265, 307/271, 328/48, 328/59, 328/61, 328/181

[51] Int. Cl. .............................. H03k 5/04

[58] Field of Search .......... 307/228, 234, 271, 265, 307/260; 328/58, 48, 59, 61, 181–185

[56] References Cited

UNITED STATES PATENTS

| | | | |
|---|---|---|---|
| 2,898,481 | 8/1959 | Gahwiler | 307/228 |
| 3,048,714 | 8/1962 | Poole | 328/58 |
| 3,211,926 | 10/1965 | Frysinger | 328/58 |
| 3,459,970 | 8/1969 | Camenzind | 328/58 |
| 3,518,558 | 6/1970 | Miller et al. | 307/271 |
| 3,629,710 | 12/1971 | Durland | 328/58 |
| 3,740,588 | 6/1973 | Stratton et al. | 307/260 |
| 3,746,891 | 7/1973 | Rowe | 307/271 |

*Primary Examiner*—Stanley D. Miller, Jr.
*Attorney, Agent, or Firm*—Dike, Bronstein, Roberts, Cushman & Pfund

[57] ABSTRACT

A system for repetitively providing a series of pulses of linearly varying periodicity where first and second signals are provided which advance at respective different constant rates and which are fed to a comparator. When the values of the two signals match, the signal having the faster rate of advance is reset so that the comparator provides output pulses of linearly varying periodicity. In an analog embodiment of the invention, the first and second signals are provided by voltage ramp generators connected to an analog comparator which resets that generator whose ramp has the steeper slope in response to each match. In a digital embodiment of the invention, the first and second signals are provided as the contents of a pair of counters which are advanced at different rates and whose contents are connected to a digital comparator. Each time the contents of the two counters match, that counter advanced at the faster rate is reset so that the output of the digital comparator is repetitive series of pulses occurring at a correspondingly linearly varying periodicity until either the slower counter resets itself or is reset by other means and then the cycle repeats. In a modification of this embodiment, a third counter is provided which is advanced at the same rate as the faster counter but which is reset each time a second digital comparator ascertains that the normal bit contents of this third counter match the first $(n-1)$ bits and $\overline{n}$, the complement of the last bit of the counter advanced at the slower rate until the slower counter is reset and the cycle repeats. In this modified digital embodiment, the two comparators repetitively provide two series of pulses, each of a linearly varying periodicity, but which are time-shifted by half a slower counter cycle with each other.

20 Claims, 6 Drawing Figures

SYSTEM FOR GENERATING PULSES OF LINEARLY VARYING PERIOD

BACKGROUND OF THE INVENTION

This invention relates to a method and apparatus for generating pulses and, more particularly, for repetitively generating a series of pulses at a linearly varying periodicity.

A signal made up of a repetitive series of pulses which occur at a linearly varying periodicity is useful for many purposes. For example, in my copending application Ser. No. 171,571 filed on Aug. 13, 1971 for VARIABLE DELAY LINE SIGNAL PROCESSOR FOR SOUND REPRODUCTION and applicant's application entitled IMPROVED SPEECH COMPRESSOR-EXPANDER filed of even date herewith, speech signals are fed for processing through an analog shift register acting as a delay line which is repetetively driven by a series of multiphase pulses occurring at a linearly varying periodicity.

OBJECTS AND SUMMARY OF THE INVENTION

Thus, it is a general object of this invention to provide a reliable system and method for repetitively generating a series of multiphase pulses occurring at a linearly varying periodicity.

It is a further object of this invention to provide such a system and method where easily available and inexpensive components may be utilized.

It is an additional object of this invention to provide such a system and method where either analog or digital components may be utilized.

It is still another object of this invention to provide such a system and method where two signals, each being made up of pulses occurring at a linearly varying periodicity, are repetitively provided and where the two signals are similar but time-shifted by $2^{m-1}$ counts with each other.

These and other objects are achieved according to the invention where first and second signals are provided which represent successive values advancing at different constant rates. The values of the two signals are compared and an output signal provided in response to each match. Each output signal is utilized to reset that signal advancing at the greater rate to its initial value so that the output signals provided in response to coincidence in the two signals occur at a linearly varying periodicity.

In an analog embodiment of the invention, the first and second signals are provided by ramp generators whose outputs are fed to an analog comparator which resets that generator whose output has the steeper slope each time the values of the two ramp signals match. In a digital embodiment of the invention, the signals are provided by counters which are advanced at two respective constant but differing rates. The contents of the counters are fed to a digital comparator whose output occurring in response to each match between the outputs of the two counters is used to gate a reset pulse to that counter advanced at the faster rate. In a modification of this digital embodiment, a third counter is provided which is also advanced at the faster rate and whose normal bits are compared by a second comparator with the first $(n-1)$ and the $\bar{n}$ bits of the counter advanced at the slower rate. In response to a match in the second comparator, the third counter is reset. Thus, with this last embodiment, the two comparators repetitively provide two time-shifted (by $2^{m-1}$ counts) output signals, each being made up of pulses occurring at a linearly varying periodicity.

DESCRIPTION OF THE PREFERRED EMBODIMENTS

Figure 1:
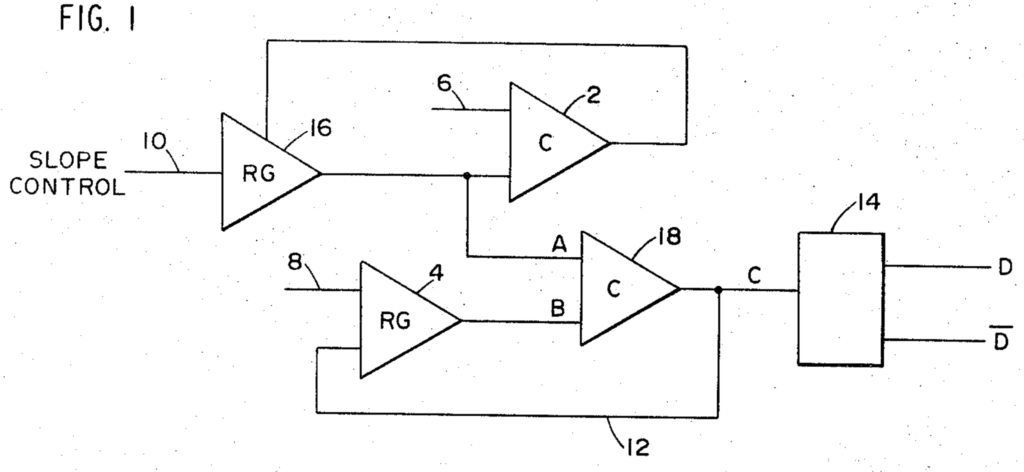
FIG. 1 is a circuit diagram of a preferred embodiment of the invention using analog components.

The preferred embodiment of the invention illustrated in FIG. 1 uses analog components and contains a voltage ramp generator 16 and a voltage ramp wave generator 4. Both these circuit elements generate a ramp voltage output signal which increases at a constant rate. The ramp generator 4 provides an output of steeper slope and which increases at a faster or greater rate than the output of the ramp generator 16. The ramp generator 16 is connected in a feedback loop with a comparator 2 having a regulating input 6. The comparator 2 receives the output from the ramp generator 16 and, in response, resets the ramp generator 16 to its initial state and initiates a new ramp each time the output of the ramp generator 16 equals the signal applied to the regulating input 6 of the comparator 2. Thus, the comparator 2 and ramp generator 16 combine to provide a periodic sawtooth waveform. The slope of this sawtooth and hence its period are determined by the signal applied to regulating input 10. The ramp generator 4 is reset to its initial state and initiates a succeeding ramp output when a signal on a lead 12 is applied to its input side. The slope of the successive ramp pulses of the ramp generator 4 is determined by signals applied to its regulating input 8.

Figure 2:
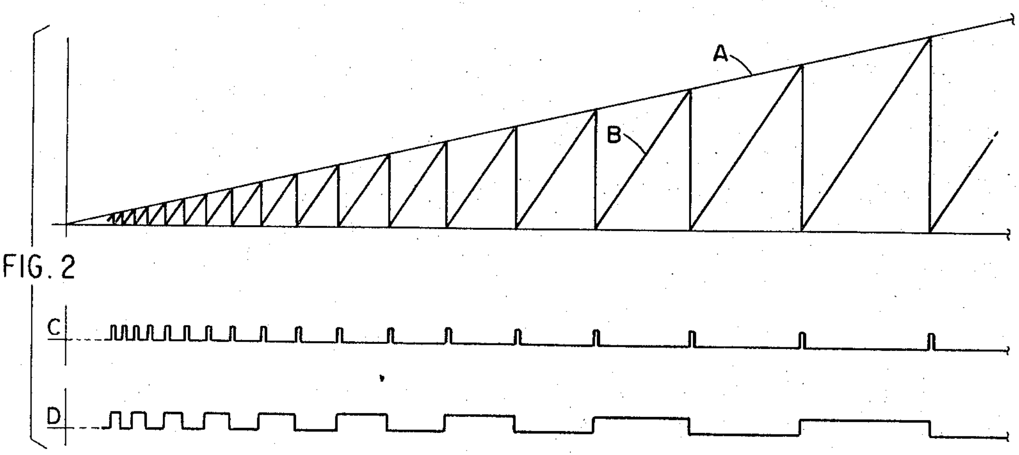
FIGS. 2 and 3 illustrate waveforms occurring within the embodiment of FIG. 1.

The ramp voltage output signal from the ramp generator 16 is applied to one input A of an analog voltage comparator 18. The comparator 18 receives at its other input B the output signal from the ramp generator 4. When the voltage values of the signals at the A and B inputs of the comparator 18 are equal and match, the comparator 18 provides a comparator trigger output pulse C which is applied on lead 12 and fed back to reset the ramp generator 4. The output of the comparator 18 thereby resets the signal applied to its B input to its initial value. FIG. 2 illustrates the signal (designated A) applied to the A input of the comparator 18 from the ramp generator 16 along with the signal (designated B) applied to the B input from the ramp generator 4. Each trigger output pulse from the comparator 18 is then applied to a flip-flop bistable circuit 14 to provide a series of square-wave pulses D.

As is shown in FIG. 2, with the output of the ramp generator 16 being a first ramp voltage signal A which increases at a constant rate and with the output of the ramp generator 4 being a second ramp signal B which increases at a rate greater than the rate of the first ramp signal, the values of these voltages will coincide at a periodicity which varies linearly with time. With the comparator 18 providing an output pulse C on each of these occasions which is thereafter converted to a square-wave pulse by the flip-flop bistable circuit 14, the output D of the circuit shown in FIG. 1 will comprise square-wave pulses having a linearly varying periodicity with time. That is, the pulses comprising the output D of the circuit become spaced further apart as time advances, the spacing between the pulses changing geometrically from one to another such as to effect a linearly changing periodicity with time.

Figure 3:
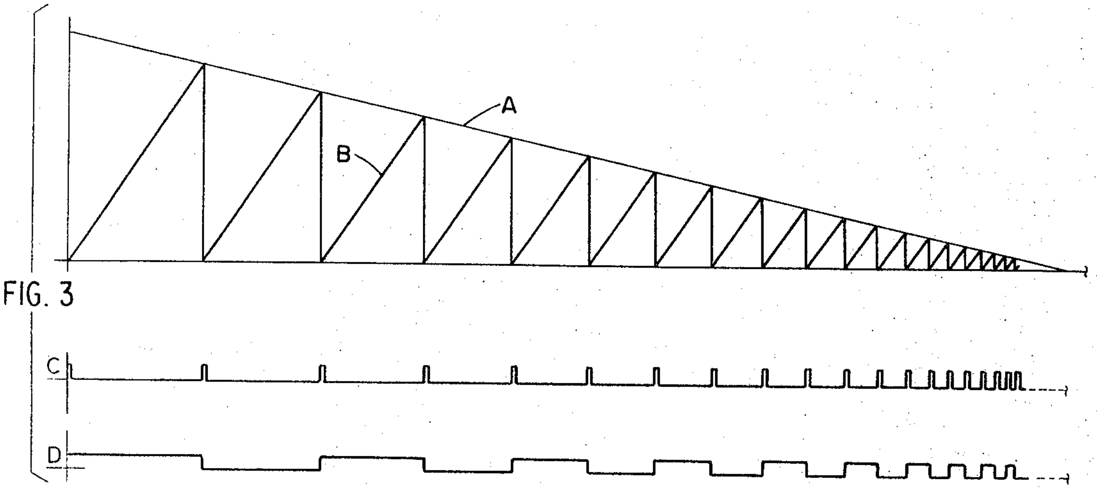

To provide pulses with a periodicity which varies linearly but decreases with time (i. e., where the pulses become spaced closer together), the slope control 10 is changed such that the ramp generator 16 output has a negative slope and proper bias as applied to the A input of the analog comparator 18. FIG. 3 illustrates the voltage ramp signals A and B applied to the comparator's respective A and B inputs when the slope control 10 is in this position. As shown in FIG. 3, the initial value of signal at the A input of the comparator is greater than the intial value of the signal at the B input of the comparator since the output from the ramp generator 16 has been positively biased by element 10. As also shown in FIG. 3, the signal at the A input of the comparator decreases from its initial greater value at a constant rate although this rate is less than the rate at which the ramp voltage from the ramp generator 4 increases. As described above, the comparator 18 provides a trigger output pulse which serves to reset the ramp generator 4 upon each match in the value of the signals at its A and B inputs. These trigger pulses are then applied to a flip-flop bistable to provide the signal D at the output of the circuit consisting of square wave pulses which occur at a linearly decreasing periodicity with respect to time.

Figure 4:
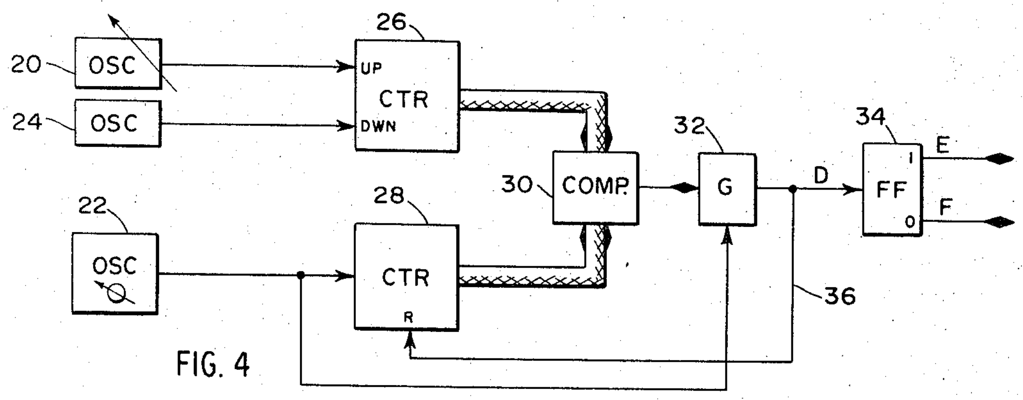
FIG. 4 illustrates a preferred embodiment of the invention utilizing digital components.

FIG. 4 shows another preferred embodiment of the invention which utilizes digital circuit components. In FIG. 4, a pair of counters 26 and 28 are advanced at different rates by a pair of adjustable pulse-rate oscillators 20 and 22 respectively as well as by a fixed-rate oscillator 24. Oscillator 20 applies pulses of adjustable pulse rate to drive counter 26 upwardly while oscillator 24 applies pulses of preselected fixed pulse rate to drive counter 26 downwardly, so that the counter's net content represents successive increasing values when the rate of oscillator 20 exceeds that of oscillator 24, and decreasing values when less. Oscillator 22 drives the counter 28 upwardly through successive increasing values but at a selected rate much greater than the rate at which the counter 26 is driven. The contents of the two counters are applied to a digital comparator 30 which provides an output pulse in response to each match between the counts accumulated. Each output pulse from the comparator is applied to condition a gate 32 such that the next count pulse from oscillator 22 is fed back on lead 36 to reset the counter 28. Thus, it is seen that the counter 26, counter 28, comparator 30 and lead 36 are analgous to the ramp generator 16, triangular wave generator 4, comparator 18 and feedback lead 12 in the analog embodiment of FIG. 1. The output of the comparator-conditioned gate is a series of trigger pulses which occur at a linearly varying periodicity which increases with time and is applied to trigger a flip-flop 34.

If an output signal is desired made up of pulses occurring at a linearly decreasing periodicity, the pulse rate of oscillator 20 is adjusted to be less than that of oscillator 24, so that the net pulse rate will drive the counter 26 downwardly. In this situation, with the counter 26 driven downwardly, the comparator 30 provides gating pulses which occur at a linearly decreasing periodicity.

Figure 6:
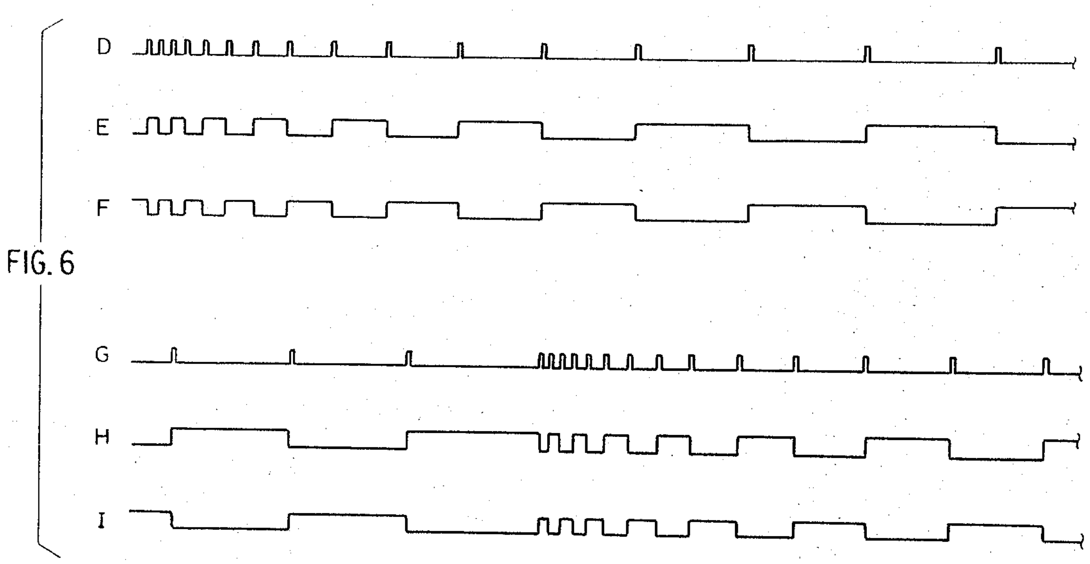
FIG. 6 illustrates waveforms occurring within the embodiments of FIGS. 4 and 5.

As shown in FIG. 4, the output of the comparator 30 is fed to a gate 32 which it successively enables at each match of the counters' contents for the pulses provided by the oscillator 22 so that resetting of the counter 28 occurs in synchronization with the pulses driving it.

Where it is desired to provide pulses which not only occur at a linearly varying periodicity but also have durations which vary linearly, the linear varying periodicity pulses from the comparator-conditioned gate 32 may be applied to the toggle input of a flip-flop 34 as shown in FIG. 4. Each pulse as shown by the signal D in FIG. 6 from the comparator 30 causes the flip-flop 34 to change state so that its 1 and 0 outputs are alternately active with a high signal as shown in FIG. 6 where E represents the signal from the 1 output and F the output from the 0 output of the flip-flop 34. The E and F signals shown in FIG. 6 occur where the counter 26 is driven upwardly so that the pulses in signal D occur at a linearly increasing periodicity and the widths of the pulses in signals E and F correspondingly increase linearly with time. Conversely, if the rate of oscillator 20 was set to drive the counter downwardly, the pulses from comparator-conditioned gate 32 would occur at a linearly decreasing periodicity causing the pulses at each of the outputs of the flip-flop 34 to decrease in duration with time. Of course, the signals at the 1 and 0 outputs of the flip-flop 34 are the inverse of each other, which is necessary to properly drive a two-phase shift register such as described in the above references patent applications.

Figure 5:
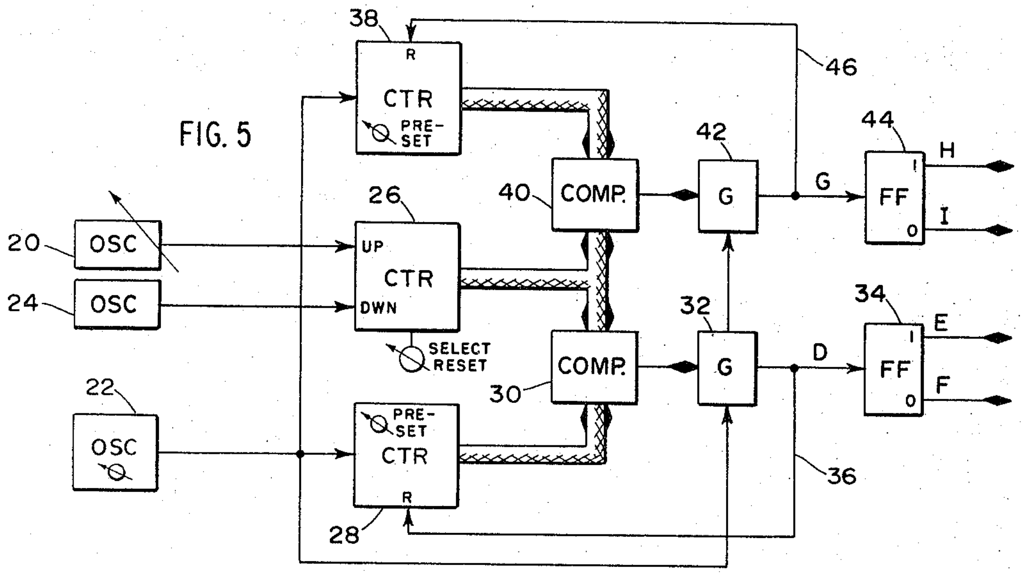
FIG. 5 illustrates another preferred embodiment of the invention which is a modification of the digital embodiment of FIG. 4.

In some applications, it may be desired to have a circuit which provides a pair of signals, each occurring at a linearly varying periodicity but which are similar but time-shifted with each other. FIG. 5 shows such a circuit as a modification of the circuit of FIG. 4. In FIG. 5, a third counter 38 is provided which is also driven upwardly by the oscillator 22 which also drives the counter 28. Thus, the counter 38 is advanced through increasing values at the same rate the counter 28 is, which is much greater than the rate at which counter 26 is advanced. Counter 26 is also driven upwardly. The content of the third counter 38 is continually fed to a second digital comparator 40 which continually receives as its other input the contents from the counter 26. In response to a match in the values of the counts accumulated such that the normal bits in counter 38 match the first $(n-1)$ and the $\bar{n}$ bits of counter 26, the comparator 40 provides an output pulse which conditions gate 42 such that the next count pulse from oscillator 22 resets the third counter 38 after being gated through a gate 42 to maintain the third counter 38 in synchronization. However, the counter 38 is continually compared to a value which is offset by $2^{n-1}$ from the contents of counter 28 as a result of comparing the n bit of the counter 38 with the $\bar{n}$ bit of the counter 28. Thus, since the initial value in counter 38 will be correspondingly offset with respect to the value in the counter 28 and since these two counters are advanced at the same rate, the value of the contents of counter 38 will match the value of the counter 26 sooner by $2^{n-1}$ counts than will the value of the counter 28. The output of the second comparator 40 will, therefore, be correspondingly time-shifted with respect to the output of the first comparator 30 even though both outputs will comprise a series of pulses occurring at a linearly varying increasing periodicity. Further, since the outputs of both comparators are dependent on the rate at which the counter 26 is advanced relative to the rate at which counters 28 and 38 are advanced, these outputs will occur at the same linearly adjustably varying periodicity albeit time-shifted by $2^{n-1}$ counts with each other.

As is also shown in FIG. 5, pulse output G of gate 42 as conditioned by the output of the comparator 40 may be applied to the toggle output of another flip-flop 44 to cause its 1 and 0 outputs to be alternately active and high in the same manner as flip-flop 34 is operated. FIG. 6 also illustrates as signal G the linearly varying periodicity pulses provided by the gate 42 as conditioned by the comparator 40 and the 1 and 0 outputs of flip-flop 44 as signals H and I respectively. The H and I signals correspond respectively to the E and F outputs from flip-flop 34 except that they are time-shifted by $2^{n-1}$ counts with them. Of course, if the counter 26 was driven downwardly in the circuit of FIG. 5, the gated G and D outputs as conditioned by comparators 40 and 30 would each comprise pulses of linearly decreasing periodicity with time and the duration of the pulses in signals H, I, E and F would linearly decrease with time.

Of course, by changing the frequencies of the oscillator 20 and 22 in FIGS. 4 and 5, the rates at which the comparators 30 and 40 provide their output pulses and the periodicity and duration of the pulses at the 1 and 0 outputs of flip-flops 34 and 44 may be changed as desired.

It will be appreciated that various changes in the form and details of the above-described preferred embodiments may be made by those skilled in the art without departing from the true spirit and scope of my invention.

I claim:

1. An apparatus for providing successive discrete signals at a linearly varying periodicity with time comprising:

means for providing a first signal representing successive values advancing at a first constant rate;

first control means for selecting said first constant rate;

means for providing a second signal representing successive values advancing at a second constant rate greater than said first rate;

second control means for selecting said second constant rate;

comparison means for comparing the values of said first and second signals and providing an output signal in response to a match in the values of said two signals;

means for resetting said means for providing a second signal in response to each said output signal so that successive output signals occur with a linearly varying period; and third control means operable in response to said first signal and a selectable input quantity for resetting said means for providing a first signal to establish the repetition interval for a predetermined succession of said output signals.

2. The apparatus as recited in claim 1 wherein the values of said first and second signals increase as they advance.

3. The apparatus as recited in claim 1 wherein the value of said first signal decreases with time, the value of said second signal increases with time and the initial value of said first signal is greater than the initial value of said second signal.

4. The apparatus as recited in claim 2 wherein said means for providing said first signal comprises a ramp generator for providing a first ramp signal;

said means for providing said second signal comprises a second ramp generator for providing a second ramp signal; and said comparison means compares the magnitudes of said first and second ramp signals.

5. The apparatus as recited in claim 3 wherein said means for providing said first signal comprises a ramp generator for providing a first ramp signal and means for causing said first ramp signal to decrease;

said means for providing said second signal comprises a second ramp generator for providing a second ramp signal; and said comparison means compares the magnitudes of said decreasing first ramp signal and said second ramp signal.

6. The apparatus as recited in claim 1 wherein each said output signal comprises a trigger pulse and further comprising means responsive to said trigger pulses for generating successive square wave pulses at a linearly varying periodicity with time.

7. The apparatus as recited in claim 1 wherein said means for providing said first signal comprises:

a first counter and oscillator means driving said first counter to advance said first counter at a first rate;

said means for providing said second signal comprises a second counter and a second oscillator driving said second counter to advance said second counter at a second rate; and said comparison means compares the accumulated counts of said first and second counters.

8. The apparatus as recited in claim 7 wherein said resetting means comprises gate means connected to the outputs of said comparison means and said second oscillator to pass an output from said comparison means upon receiving a pulse from said second oscillator, the output of said gate means resetting said second counter.

9. The apparatus as recited in claim 7 and further including a bistable circuit adapted to respond to each successive output signal by successively changing rate.

10. The apparatus as recited in claim 9 wherein said bistable circuit comprises a flip-flop.

11. The apparatus as recited in claim 7 wherein each of said counters is advanced through increasing values when driven by their respective oscillators.

12. The apparatus as recited in claim 7 wherein said second counter is advanced through increasing values by said second oscillator and said first counter is advanced through decreasing values by said first oscillator, the initial value of said first counter being greater than the initial value of said second counter.

13. The apparatus as recited in claim 7 and further comprising:

a third counter connected to be advanced by said second oscillator;

a second comparison means for comparing the counts of said first counter and said third counter and providing an output in response to a match in their counts; and means for resetting said third counter in response to each output from said second comparison means, said third counter being reset to a different value than is said second counter so that the outputs from the first recited and said first and second comparison means are time-shifted by said offset number of counts with each other.

14. The apparatus as recited in claim 13 wherein said third counter resetting means comprises gate means connected to the outputs of said second comparison means so as to condition said gating means to pass a pulse from said second oscillator, the output of said gating means resetting said third counter.

15. The apparatus as recited in claim 13 and further including a bistable circuit adapted to respond to each successive output signal from resulting said second comparison means by successively changing states.

16. The apparatus as recited in claim 15 wherein said bistable circuit comprises a flip-flop.

17. The apparatus as recited in claim 7 and further comprising:

a third counter connected to be advanced by said second oscillator;

a second comparison means for comparing the counts of said first counter and said third counter and providing an output in response to a preset offset match in their counts; and means for resetting said third counter in response to each output from said second comparison means so that the outputs from the first recited and said second comparison means are time-shifted by said offset number of counts with each other.

18. The apparatus as recited in claim 17 wherein said third counter resetting means comprises gate means connected to the outputs of said second comparison means so as to condition said gating means to pass a pulse from said second oscillator, the output of said gating means resetting said third counter.

19. The apparatus as recited in claim 17 and further including a bistable circuit adapted to respond to each successive output signal from resulting said second comparison means by successively changing states.

20. The apparatus as recited in claim 19 wherein said bistable circuit comprises a flip-flop.

* * * * *